United States Patent [19]
Schröder et al.

[11] Patent Number: 6,114,512
[45] Date of Patent: Sep. 5, 2000

[54] OLIGOMERIC AZO DYES

[75] Inventors: Gunter-Rudolf Schröder, Mannheim; Torsten Freund, Limburgerhof; Udo Mayer; Karl-Heinz Etzbach, both of Frankenthal, all of Germany

[73] Assignee: BASF Aktiengesellschaft, Ludwigshafen, Germany

[21] Appl. No.: 09/380,618

[22] PCT Filed: Mar. 6, 1998

[86] PCT No.: PCT/EP98/01325

§ 371 Date: Sep. 17, 1999

§ 102(e) Date: Sep. 17, 1999

[87] PCT Pub. No.: WO98/41581

PCT Pub. Date: Sep. 24, 1998

[30] Foreign Application Priority Data

Mar. 18, 1997 [DE] Germany .............. 197 11 169

[51] Int. Cl.[7] .......................... C09B 35/64; C09B 67/22; C09B 69/10; D06P 3/32

[52] U.S. Cl. .......................... 534/685; 534/689; 534/805; 534/DIG. 3

[58] Field of Search ................... 534/685, 689, 534/805

[56] References Cited

FOREIGN PATENT DOCUMENTS

| 2360635 | 3/1978 | France . |
|---------|--------|----------|
| 4124437 | 1/1992 | Germany . |
| 533060 | 2/1941 | United Kingdom . |
| 785084 | 10/1955 | United Kingdom . |

*Primary Examiner*—Fiona T. Powers
*Attorney, Agent, or Firm*—Oblon, Spivak, McClelland, Maier & Neustadt, P.C.

[57] ABSTRACT

Oligomeric azo dyes having an alternating construction made up of diazo components and coupling components, containing in the molecule at least 3 units of the structure I

—[D—K]— (I)

where D is a tetrazo component of the formula II

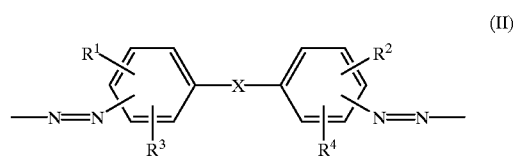

(II)

where x is a direct bond, oxygen, sulfur or a bridge member of the formula —NHCO—, —NHCONH—, —CO—, —NHSO$_2$—, —SO$_2$NHSO$_2$—, —SO$_2$—, —SO$_2$—NH—A—NH—SO$_2$—, -NAlk-CO-, -NAlk-CO-NAlk-, -NAlk-CO—NH—, -NAlk-SO$_2$—, —SO$_2$-NAlk-SO$_2$—, —SO$_2$-NAlk-A-NAlk-SO$_2$—, —SO$_2$-NAlk-A-NH—SO$_2$—, —CH═CH—, —CH$_2$CH$_2$—, —C(CH$_3$)$_2$—, —CH$_2$— or —NH—, $R^1$ and $R^2$ are each independently of the other hydrogen, $C_1$–$C_4$-alkyl, $C_1$–$C_4$-alkoxy, $C_1$–$C_4$-alkanoyl, cyano, carboxyl, hydroxysulfonyl, $C_1$–$C_4$-alkoxycarbonyl, hydroxyl, carbamoyl, mono- or di-($C_1$–$C_4$)-alkylcarbamoyl, sulfamoyl, mono- or di-($C_1$–$C_4$)-alkylsulfamoyl, fluorine, chlorine, bromine, nitro or trifluoromethyl and $R^3$ and $R^4$ are each independently of the other hydrogen, hydroxysulfonyl or carboxyl, and where K is a coupling component III of the aminonaphthol series, it being possible for up to 90 mol % of component III to be replaced by a coupling component IV, are prepared and used for dyeing natural or synthetic substrates.

9 Claims, No Drawings

OLIGOMERIC AZO DYES

The present invention relates to oligomeric azo dyes having an alternating construction made up of diazo components and coupling components, containing in the molecule at least 3 units of the structure I $$-[D-K]-\quad (I)$$

where D is a tetrazo component of the formula II

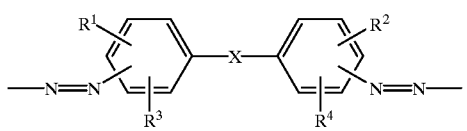

where x is a direct bond, oxygen, sulfur or a bridge member of the formula —NHCO—, —NHCONH—, —CO—, —NHSO$_2$—, —SO$_2$NHSO$_2$—, —SO$_2$—, —SO$_2$—NH—A—NH—SO$_2$—, -NAlk-CO-, -NAlk-CO-NAlk-, -NAlk-CO—NH—, -NAlk-SO$_2$—, —SO$_2$-NAlk-SO$_2$—, —SO$_2$-NAlk-A-NAlk-SO$_2$—, —SO$_2$-NAlk-A-NH—SO$_2$—, —CH=CH—, —CH$_2$CH$_2$—, —C(CH$_3$)$_2$—, —CH$_2$— or —NH—, R$^1$ and R$^2$ are each independently of the other hydrogen, C$_1$–C$_4$-alkyl, C$_1$–C$_4$-alkoxy, C$_1$–C$_4$-alkanoyl, cyano, carboxyl, hydroxysulfonyl, C$_1$–C$_4$-alkoxycarbonyl, hydroxyl, carbamoyl, mono- or di-(C$_1$–C$_4$)-alkylcarbamoyl, sulfamoyl, mono- or di-(C$_1$–C$_4$)-alkylsulfamoyl, fluorine, chlorine, bromine, nitro or trifluoromethyl, R$^3$ and R$^4$ are each independently of the other hydrogen, hydroxysulfonyl or carboxyl, Alk is C$_1$–C$_4$-alkyl with or without hydroxyl, cyano, mono- or di-(C$_1$–C$_4$)-alkylamino, amino, carboxyl or hydroxysulfonyl substitution and with or without interruption by 1 oxygen atom, and A is phenylene with or without hydroxysulfonyl substitution, and where K is a bivalent radical or a coupling component of the formula III

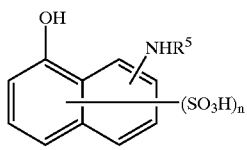

where

R$^5$ is hydrogen, C$_1$–C$_4$-alkyl with or without hydroxyl, cyano, carboxyl, hydroxysulfonyl, methoxycarbonyl, ethoxycarbonyl or acetoxy substitution, and n is 1 or 2, it being possible for up to 90 mol % of component III to be replaced by a coupling component of the formula IV

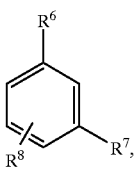

where

R$^6$ and R$^7$ are each independently of the other hydroxyl, amino, morpholino, NHAlk or N(Alk)$_2$, and R$^8$ is hydrogen, carboxyl, hydroxysulfonyl, C$_1$–C$_4$-alkyl, C$_1$–C$_4$-alkoxy, C$_1$–C$_4$-alkoxycarbonyl, carbamoyl, mono- or di-(C$_1$–C$_4$)-alkylcarbamoyl, sulfamoyl, mono- or di-(C$_1$–C$_4$)-alkylsulfamoyl, —NHAlk or —N(Alk)$_2$, to a process for their preparation, to their use for dyeing and printing natural or synthetic substrates and also to mixtures comprising the novel dyes.

DE-A 41 24 437 discloses black azo dyes obtained by three successive couplings of 4,4'-diaminodiphenylamine-2-sulfonic acid, resorcinol and aniline onto 1-amino-8-hydroxynaphthalene-3,6-disulfonic acid or the respective coupling product. The stoichiometry chosen in this reference relates to a mixture of different trisazo dyes.

DE-A 27 33 107 describes symmetrical hexakisazo compounds obtained stepwise by coupling of tetrazotized 4,4'-diaminostilbene-2,2'-disulfonic acid with the monoazo dye obtained by coupling of 1-amino-5-nitrobenzene-2-sulfonic acid and 1-amino-8-hydroxynaphthalene-3,6-disulfonic acid and after reduction of the nitro group of the reaction product and a subsequent diazotization in a third coupling step with resorcinol.

A common feature of these dyes is their unsatisfactory fastness. The wet and perspiration fastnesses are inadequate especially when used as leather dyes.

It is an object of the present invention to provide novel azo dyes having advantageous application properties, especially good wet and perspiration fastness properties.

We have found that this object is achieved by the oligomeric azo dyes defined at the beginning.

Since the oligomeric azo dyes contain a plurality of hydroxysulfonyl groups and also, optionally, carboxyl groups, their salts are comprehended by the invention, too.

Suitable salts are metal or ammonium salts. Metal salts are especially the lithium, sodium or potassium salts. Ammonium salts for the purposes of the invention are salts having either unsubstituted or substituted ammonium cations. Examples of substituted ammonium cations are monoalkyl-, dialkyl-, trialkyl-, tetraalkyl- or benzyltrialkyl-ammonium cations or cations derived from nitrogenous five- or six-membered saturated heterocycles, such as pyrrolidinium, piperidinium, morpholinium or piperazinium cations or their N-monoalkyl- or N,N-dialkyl-substituted products. Alkyl here is generally to be understood as meaning straight-chain or branched C$_1$–C$_{20}$-alkyl with or without substitution by from 1 to 3 hydroxyl groups and with or without interruption by from 1 to 4 oxygen atoms in ether function.

Any substituted alkyl appearing in the abovementioned formulae generally has 1 or 2 substituents, especially one substituent.

The phenylene group A is preferably 1,3- or 1,4-phenylene. If substituted, it generally bears 1 or 2, preferably one, hydroxysulfonyl radical.

$R^1$, $R^2$, $R^5$, $R^8$ and Alk are each for example methyl, ethyl, propyl, isopropyl, butyl, isobutyl, sec-butyl or tert-butyl.

$R^1$, $R^2$ and $R^8$ may each also be for example methoxy, ethoxy, propoxy, isopropoxy, butoxy, sec-butoxy, tert-butoxy, methoxycarbonyl, ethoxycarbonyl, propoxycarbonyl, isopropoxycarbonyl, butoxycarbonyl, sec-butoxycarbonyl, tert-butoxycarbonyl, mono- or dimethylcarbamoyl, mono- or diethylcarbamoyl, mono- or dipropylcarbamoyl, mono- or dibutylcarbamoyl, mono- or dimethylsulfamoyl, mono- or diethylsulfamoyl, mono- or dipropylsulfamoyl and mono- or dibutylsulfamoyl.

$R^1$ and $R^2$ may each also be for example formyl, acetyl, propionyl or butyryl.

$R^5$ and Alk may each also be for example hydroxymethyl, 2-hydroxy-ethyl, 2- or 3-hydroxypropyl, 2- or 4-hydroxybutyl, cyanomethyl, 2-cyanoethyl, 2- or 3-cyanopropyl, 2- or 4-cyanobutyl, carboxymethyl, 2-carboxyethyl, 2- or 3-carboxypropyl, 2- or 4-carboxybutyl, hydroxysulfonylmethyl, hydroxysulfonylethyl, 2- or 3-hydroxysulfonylpropyl, 2- or 4-hydroxysulfonylbutyl.

$R^5$ may also be for example methoxycarbonylmethyl, methoxycarbonylethyl, 2- or 3-methoxycarbonylpropyl, 2- or 4-methoxycarbonyl-butyl, ethoxycarbonylmethyl, ethoxycarbonylethyl, 2- or 3-ethoxycarbonylpropyl, 2- or 4-ethoxycarbonylbutyl, acetoxymethyl, acetoxyethyl, 2- or 3-acetoxypropyl or 2- or 4-acetoxybutyl.

Alk may also be for example mono- or dimethylaminomethyl, 2-mono- or dimethylaminoethyl, 2- or 3-mono- or dimethylaminopropyl, 2- or 4-mono- or dimethylaminobutyl, mono- or diethylaminomethyl, 2-mono- or diethylaminoethyl, 2- or 3-mono- or diethylaminopropyl, 2- or 4-mono- or diethylaminobutyl, aminomethyl, 2-aminoethyl, 2- or 3-aminopropyl, 2- or 4-aminobutyl, 2-methoxyethyl or 2-ethoxyethyl.

A is for example 1,2-, 1,3- and 1,4-phenylene, 2-hydroxysulfonyl-1,3-phenylene, 2-hydroxysulfonyl-1,4-phenylene or 2,5-dihydroxy-sulfonyl-1,4-phenylene.

The bridge member X connects to the phenylene rings at each end ortho, meta or para to the respective diazo group. Preference is given to polyazo dyes in which both links are para.

Aromatic diamines useful as tetrazo components are for example 3,3'-diaminodiphenyl sulfone, 4,4'-diaminodiphenyl sulfone, 4,4'-diaminostilbene-2,2'-disulfonic acid, 2,2'-diaminodiphenyl sulfone, 4,5-disulfo-2,2'-sulfonyldianiline, 4,4'-diaminobenzophenone, 3,3'-diamino-4,4'-dichlorobenzophenone, 4,4'- or 3,3'-diaminobiphenyl, 4,4'-diamino-3,3'-dichlorobiphenyl, 4,4'-diamino-3,3'-dimethoxy- or -3,3'-dimethyl- or -2,2'-dimethyl- or -2,2'-dichloro- or -3,3'-diethoxybiphenyl, 4,4'-diaminobiphenyl-2,2'- or -3,3'-disulfonic acid, 4,4'-diaminobiphenyl-2,2'- or -3,3'-dicarboxylic acid, 4,4'-diamino-3-ethoxy- or -3-hydroxy-sulfonylbiphenyl, 4,4'-diaminodiphenylmethane, 4,4'-diamino-3,3'-dimethyldiphenyl-methane, 4,4'-diaminodiphenylethane, 4,4'-diaminostilbene or 4,4'-diaminodiphenylmethane-3,3,-dicarboxylic acid, 4,4'-diaminodiphenylamine, 4,4,-diaminodiphenylamine-2-sulfonic acid, 4,4'-diaminosulfanilide and N-(4-aminophenyl)-4-aminobenzenesulfonamide.

In what follows, aminonaphtholsulfonic acids are recited as coupling component III by way of example. Specific examples are 1-amino-5-hydroxynaphthalene-7-sulfonic acid, 1-amino-8-hydroxynaphthalene-4-sulfonic acid, 1-amino-8-hydroxynaphthalene-3,6-disulfonic acid, 1-amino-8-hydroxynaphthalene-4,6-disulfonic acid, 2-amino-5-hydroxynaphthalene-7-sulfonic acid, 2-amino-8-hydroxynaphthalene-6-sulfonic acid, 2-amino-8-hydroxynaphthalene-3,6-disulfonic acid, 2-amino-5-hydroxynaphthalene-1,7-disulfonic acid, 1-hydroxysulfonylmethylamino-8-hydroxynaphthalene-3,6-disulfonic acid, 2-methylamino-8-hydroxynaphthalene-6-sulfonic acid, 2-methylamino-8-hydroxynaphthalene-6-sulfonic acid, 2-hydroxysulfonylmethylamino-8-hydroxynaphthalene-6-sulfonic acid.

Coupling components of the formula IV include especially resorcinol, 1,3-phenylenediamine, 3-aminophenol, 4-methyl-3-aminophenol, 2,4-dihydroxybenzoic acid, 2,4-diaminobenzenesulfonic acid, 5-amino-2-methylphenol, 4-chloro-3-aminophenol and 2,4-diaminotoluene.

Preference is given to oligomeric azo dyes in which X is a direct bond or a bridge member of the formula —NHCO—, —NHCONH—, —NHSO$_2$—, —SO$_2$—, —CH=CH—, —CH$_2$CH$_2$—, —CH$_2$— and —NH— and in particular a bridge member of the formula —CH=CH—, —NH— or —SO$_2$NH—.

Preference is further given to oligomeric azo dyes in which $R^1$ and $R^2$ are each independently of the other hydrogen, hydroxysulfonyl, carboxyl, sulfamoyl or mono- or di-($C_1$–$C_4$)-alkylsulfamoyl, especially hydrogen or hydroxysulfonyl. It is particularly preferable for $R^3$ and $R^4$ to each be hydrogen in combination with these radicals.

In one embodiment of the present invention, the oligomeric azo dyes contain only bivalent radicals K of the coupling components of the formula III. However, preference is given to oligomeric azo dyes whose bivalent radicals K are derived from coupling components of the formula III and of the formula IV, the proportion of the latter being up to 90 mol % of the sum of all coupling components.

Preference is given to oligomeric azo dyes in which the proportion of coupling component IV is from 10 to 75 mol % of the bivalent radical K, ie. from 10 to 75 mol % of component III are replaced by component IV.

Particular preference is given to oligomeric azo dyes in which from 30 to 60 mol % of the aminonaphtholsulfonic acids III are replaced by component IV.

Oligomeric azo dyes with 1-amino-8-hydroxynaphthalene-4,6-disulfonic acid, 2-amino-8-hydroxynaphthalene-6-sulfonic acid, 3-amino-8-hydroxynaphthalene-6-sulfonic acid and especially with 1-amino-8-hydroxynaphthalene-3,6-disulfonic acid as coupling components III are generally preferred.

The oligomeric azo dyes can be prepared using a mixture of different tetrazo components of the formula II as well as a single tetrazo component. Similarly, the invention comprehends oligomeric azo dyes obtained by mixing a plurality of coupling components III and/or coupling components IV. The use of an aminonaphthol acid mixture enables the controlled synthesis of black leather dyes having a blue or red tinge.

The azo dyes of the present invention can be prepared by a basic coupling step following an acid coupling step.

In the first, acidic coupling step, a previously diazotized amine of the formula V

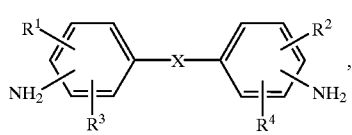

where $R^1$, $R^2$, $R^3$, $R^4$ and X are each as defined above, are coupled onto the coupling component K to form the "monomer unit", which is polycondensed under basic conditions in the second step, with or without addition of further tetrazo component, depending on the chosen stoichiometry.

For example, the azo dyes of the present invention are obtainable by tetrazotizing 1 mol equivalent of a diamine of the formula V

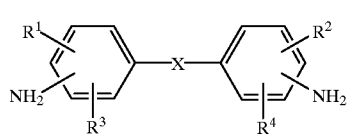

and coupling the product with from 0.97 to 1.03 mol equivalents of a coupling component III, it being possible for up to 90 mol % of component III to be replaced by a component IV, in an acidic medium and then polycondensing the product in a basic medium.

Another process variant comprises reacting 1 mol equivalent of a tetrazotized diamine V with from 0.97 to 1.03 mol equivalents of a coupling component of the formula VI

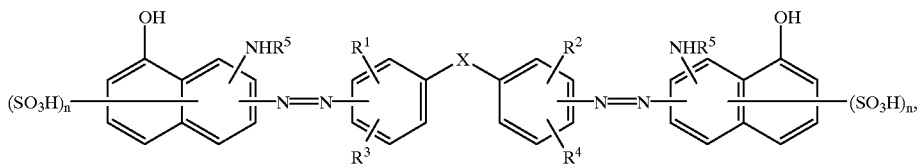

where $R^1$, $R^2$, $R^3$, $R^4$, $R^5$, X and n are each as defined above, in a basic medium to form a polycondensation product, it being possible for up to 60 mol % of component VI to be replaced by a component VI. The coupling component VI used can be constructed step by step in a manner familiar to one of ordinary skill in the art.

An advantageous variant of obtaining the oligomeric azo dyes comprises tetrazotizing 1 mol equivalent of a diamine V and coupling the product with from 1.95 to 2.05 mol equivalents of a coupling component III in an acidic medium and then adding y mol equivalents of a coupling component IV and polycondensing the mixture with 1+y mol equivalents of a previously tetrazotized diamine under basic conditions, y being from 0 to 0.6.

Particular preference is given to processes in which 1 mol of tetrazotized diamine V is reacted with 0.99–1.01 mol, especially with an equimolar amount, of coupling component III or VI to form the polycondensation product, although, as indicated above, some of the coupling component can be replaced by coupling component IV.

The coupling component can be added a little at a time. The diamines are tetrazotized in a conventional manner, for example with sodium nitrite under acidic conditions usually at from –5° C. to 25° C. The nitrite is generally used in excess, and after the di- or tetrazotization the excess nitrite is destroyed with sulfamic acid, for example.

The coupling steps are advantageously carried out in an aqueous medium. The temperature is generally within the range from –5 to 25° C. for both steps.

For the acidic coupling step, the pH is within the range from 0 to 4, preferably <2. The coupling time is at least 15 minutes, although a duration of 15 hours is normally not exceeded. In general, coupling will be complete after 2–3 hours.

The basic coupling is carried on to complete conversion. The end of the reaction is readily determined from the decrease in the tetrazo component. Typically, the end-point is reached within from about 15 minutes to 2 hours of the last addition.

Longer stirring times are possible, but generally have no effect on the degree of polymerization. For safety reasons, it is advisable to raise the temperature of the reaction mixture briefly to around 50° C. after coupling has taken place in order that last traces of diazo component may be destroyed.

The basic coupling step is carried out at a pH above 7, preferably within the range from 7.5 to 13. The adjustment of the desired pH to higher values and, if necessary, the maintenance during the coupling are effected as commonly known by addition of ammonium bases or alkali metal bases, eg. sodium hydroxide, sodium carbonate or sodium acetate.

In the polycondensation step, chain termination is thought to be brought about, for example, by further coupling onto a coupling component which no longer has a reactive end or by decomposition of diazonium salt. However, the termination reaction can also be effected in a specific manner by addition of the monofunctional diazo component or of a coupling component which couples just singly. Their effect is comparable to that of a "regulator" and leads to a reduction in the degree of polycondensation.

Monofunctional coupling components are capable of just one coupling, and include, for example, phenol, o- or m-toluidine, o- or m-anisidine, cresidine, 2,5-dimethylaniline, 2,5-dimethoxyaniline, m-aminoacetanilide, 3-amino-4-methoxyacetanilide, 3-amino-4-methylacetanilide, m-aminophenylurea, N-methylaniline, N-methyl-m-toluidine, N-ethylaniline, N-ethyl-m-toluidine, phenol, methylphenol and hydroxybenzoic acid.

They are generally added to the reaction mixture after the acidic coupling has taken place, in a k-molar amount, based on 1 mol of starting diamine, k being from 0.001 to 0.05 and the proportion of coupling component being diminished by 0.5 k.

If, alternatively, a monofunctional diazo component is used as molecular weight regulator, 0.5 k mol of the diamine are replaced by k mol of a monoamine, based on 1 mol of coupling component.

Suitable monoamines of the aniline series are, for example, aniline and substituted anilines such as 2-methoxyaniline, 2-methylaniline, 4-chloro-2-aminoanisole, 2,5-dimethoxyaniline, 2,5-dimethylaniline, 2,4-dimethylaniline, 2,5-diethoxyaniline, 2-chloroaniline, 3-chloroaniline, 4-chloroaniline, 2,5-dichloroaniline, 4-chloro-2-nitroaniline, 4-chloro-2-methylaniline, 3-chloro-2-methylaniline, 4-chloro-2-aminotoluene, 2-phenylsulfonylaniline, 4-methylsulfonylaniline, 2,4-dichloroaniline-5-carboxylic acid, 2-, 3- or 4-aminobenzoic acid, 3-chloroaniline-6-carboxylic acid, aniline-2- or -3- or -4-sulfonic acid, aniline-2,5-disulfonic acid, aniline-2,4-disulfonic acid, aniline-3,5-disulfonic acid, 2-aminotoluene-4-sulfonic acid, 2-aminoanisole-4-sulfonic acid, 2-aminoanisole-5-sulfonic acid, 2-ethoxyaniline-5-sulfonic acid, 2-ethoxyaniline-4-sulfonic acid, 2,5-dimethoxyaniline-4-sulfonic acid, 2,4-dimethoxyaniline-5-sulfonic acid, 2-methoxy-5-methylaniline-4-sulfonic acid, 4-aminoanisole-3-sulfonic acid, 4-aminotoluene-3-sulfonic acid, 2-aminotoluene-5-sulfonic acid, 2-chloroanilinesulfonic acid, 2-chloroaniline-5-sulfonic acid, 2-bromoaniline-4-sulfonic acid, 2,6-dichloroaniline-4-sulfonic acid, 2,6-dimethylaniline-3- or -4-sulfonic acid, 3-acetylaminoaniline-6-sulfonic acid, 4-acetylaminoaniline-2-sulfonic acid, 2-aminophenol-4-sulfonic acid and 2-aminophenol-5-sulfonic acid.

The degree of polycondensation of the azo dyes of the present invention is dependent on synthesis conditions, starting materials and their stoichiometry. However, presumably the degree of polycondensation does not exceed 100, because of termination reactions.

Particular preference is given to oligomeric azo dyes whose average degree of polymerization is greater than 3.

The azo dyes obtainable by the above-described processes are mixtures having an average degree of polycondensation. Their separation is possible, but not necessary. Advantageously, the dye mixtures obtainable by the process of the present invention are used without further separation.

The oligomeric azo dyes of the present invention are readily soluble in water at a pH above 8.

The dyes of the present invention are advantageously useful for dyeing natural or synthetic substrates, for example cotton, wool, polyamide and especially leather. They are further useful as paper dyes for pulp dyeing and recording fluids such as inks, especially for ink-jet printing.

The dyeings obtained have good wet and perspiration fastness properties.

The novel dyes may be used alone, mixed with each or one another and mixed with other dyes.

The Examples which follow illustrate the invention.

EXAMPLE 1 a) 25 mmol of 4,4'-diamino(diphenylamine)-2-sulfonic acid were stirred in 50 ml of water and 25 ml of hydrochloric acid (5M) at room temperature for one hour. 50 g of ice and 15.5 ml of a sodium nitrite solution (23% strength by weight, 3.33M) are added, and stirring was continued at 0–5° C. for one hour. The excess nitrite was removed with sulfamic acid, and sodium bicarbonate was used to set a pH of 2, affording the solution of the tetrazo component.

b) A mixture of 6.25 mmol of 1-amino-8-naphthol-3,6-disulfonic acid and 18.75 mmol of resorcinol (coupling component IV) was dissolved in 100 ml of water at pH 6–7, and this solution was added dropwise to the ice-cold solution of the diazonium component having a pH of 2. The batch was subsequently stirred at pH 1–3 and 5–10° C. for 2.5 hours. The pH was then gradually raised to 8–9 with 50% strength by weight aqueous sodium hydroxide solution, and stirring was continued for a further twelve hours. The reaction mixture was heated to 50° C. for two hours, the pH lowered to 1.5 with 37% strength by weight hydrochloric acid and the precipitated solid isolated.

Example 1 was repeated with the diamines recited in Table 1 (x mmol), 1-amino-8-naphthol-3,6-disulfonic acid (y mmol) and coupling component IV (z mmol), affording dyes which have good fastnesses on leather. The color on pure chrome leather is reported.

TABLE 1

| Ex. | Diamine | Coupling component IV | x | y | z | Color |
|---|---|---|---|---|---|---|
| 1.1 | 4,4'-diamino(diphenylamine)-2-sulfonic acid | resorcinol | 25 | 6.25 | 18.75 | reddish black |
| 1.2 | 4,4'-diamino(diphenylamine)-2-sulfonic acid | resorcinol | 25 | 12.5 | 12.5 | black |
| 1.3 | 4,4'-diamino(diphenylamine)-2-sulfonic acid | resorcinol | 25 | 18.75 | 6.25 | bluish black |
| 1.4 | 4,4'-diamino(diphenylamine)-2-sulfonic acid | 1,3-phenylenediamine | 25 | 6.25 | 18.75 | bluish black |
| 1.5 | 4,4'-diamino(diphenylamine)-2-sulfonic acid | 1,3-phenylenediamine | 25 | 12.5 | 12.5 | black |
| 1.6 | 4,4'-diamino(diphenylamine)-2-sulfonic acid | 1,3-phenylenediamine | 25 | 18.75 | 6.25 | bluish black |
| 1.7 | 4,4'-diamino(diphenylamine)-2-sulfonic acid | 3-aminophenol | 25 | 6.25 | 18.75 | blue |
| 1.8 | 4,4'-diamino)diphenylamine)-2-sulfonic acid | 3-aminophenol | 25 | 12.5 | 12.5 | bluish black |
| 1.9 | 4,4'-diamino(diphenylamine)-2-sulfonic acid | 3-aminophenol | 25 | 18.75 | 6.25 | blue |
| 1.10 | 4,4'-diamino-stilbene-2,2'-disulfonic acid | resorcinol | 50 | 25 | 25 | reddish black |

EXAMPLE 2

0.025 mol of 4,4'-diamino(diphenylamine)-2-sulfonic acid is tetrazotized similarly to Example 1a). 0.00625 mol of 1-amino-8-naphthol-3,6-disulfonic acid (coupling component 1) was dissolved in 50 ml of water at pH 6–7 and this solution was added dropwise to the ice-cold solution of the diazonium component having a pH of 2. The mixture was subsequently stirred at pH 1–2 and 0–5° C. for two hours. 0.01875 mol of resorcinol (coupling component IV) was then added and stirred in for 0.25 hours. The pH was adjusted to 8–11 with 50% strength by weight aqueous sodium hydroxide solution. The reaction mixture was stirred at room temperature for twelve hours. The reaction mixture was heated to 50° C. for two hours, the pH was reduced to 1.5 with 37% strength by weight hydrochloric acid and the precipitated solid isolated.

Dyes were prepared similarly to Example 2 using the diamines (25 mmol) specified in Table 2, 1-amino-8-naphthol-3,6-disulfonic acid (x mmol) and coupling component IV (y mmol).

TABLE 2

| Ex. | Diamine | Coupling component IV | x | y | Color |
|---|---|---|---|---|---|
| 2.1 | 4,4'-diamino(di-phenylamine)-2-sulfonic acid | 1,3-phenylenediamine | 6.25 | 18.75 | reddish black |
| 2.2 | 4,4'-diamino(di-phenylamine)-2-sulfonic acid | 1,3-phenylenediamine | 12.5 | 12.5 | black |
| 2.3 | 4,4'-diamino(di-phenylamine)-2-sulfonic acid | 1,3-phenylenediamine | 18.75 | 6.25 | blue |
| 2.4 | 4,4'-diamino(di-phenylamine)-2-sulfonic acid | 3-aminophenol | 6.25 | 18.75 | reddish gray |
| 2.5 | 4,4'-diamino(di-phenylamine)-2-sulfonic acid | 3-aminophenol | 12.5 | 12.5 | reddish gray |
| 2.6 | 4,4'-diamino(di-phenylamine)-2-sulfonic acid | 3-aminophenol | 18.75 | 6.25 | blue |
| 2.7 | 4,4'-diamino(di-phenylamine)-2-sulfonic acid | resorcinol | 6.25 | 18.75 | reddish gray |
| 2.8 | 4,4'-diamino)di-phenylamine)-2-sulfonic acid | resorcinol | 12.5 | 12.5 | reddish gray |
| 2.9 | 4,4'-diamino(di-phenylamine)-2-sulfonic acid | resorcinol | 18.75 | 6.25 | blue |
| 2.10 | 4-amino-N-(4-aminophenyl)-benzenesulfonamide | resorcinol | 6.25 | 18.75 | beige |
| 2.11 | 4-amino-N-(4-aminophenyl)-benzenesulfonamide | resorcinol | 12.5 | 12.5 | brownish olive |
| 2.12 | 4-amino-N-(4-aminophenyl)-benzenesulfonamide | resorcinol | 18.75 | 6.25 | blue |
| 2.13 | 4-amino-N-(4-aminophenyl)-benzenesulfonamide | 3-aminophenol | 6.25 | 18.75 | beige |
| 2.14 | 4-amino-N-(4-aminophenyl)-benzenesulfonamide | 3-aminophenol | 12.5 | 12.5 | brownish olive |
| 2.15 | 4-amino-N-(4-aminophenyl)-benzenesulfonamide | 3-aminophenol | 18.75 | 6.25 | blue |
| 2.16 | 4,4'-diamino(di-phenylamine)-2-sulfonic acid | 1,3-phenylenediamine | 6.25 | 18.75 | beige |
| 1.17 | 4,4'-diamino(di-phenylamine)-2-sulfonic acid | 1,3-phenylenediamine | 12.5 | 12.5 | brown |
| 2.18 | 4,4'-diamino(di-phenylamine)-2-sulfonic acid | 1,3-phenylenediamine | 18.75 | 6.25 | brown |

EXAMPLE 3 a) 13.96 g (0.05 mol) of 5-amino-2-[(4-aminophenyl)amino]-benzenesulfonic acid were stirred in 100 ml of water and 50 ml of 5N hydrochloric acid at room temperature for 1 h. 100 g of ice were added, followed by 31 ml of a 3.3M sodium nitrite solution. After subsequent stirring for 45 min, the excess nitrite was removed with sulfamic acid, and the pH was then adjusted to 2 with sodium carbonate.

b) To this suspension was added dropwise over 30 min a solution of 15.49 g (0.0485 mol) of 1-amino-8-naphthol-3,6-disulfonic acid in 200 ml of water, which had been prepared by adjusting the pH to pH 6–7 with 50% strength by weight aqueous sodium hydroxide solution. The batch was subsequently stirred for 2 h and then adjusted to pH 10–12 with 20% strength by weight aqueous sodium hydroxide solution. Further stirring for 15 h was followed by adjustment to pH 2 with concentrated hydrochloric acid and salting out with potassium chloride. The polymeric dye formed was isolated and dried, affording 29.5 g (95% of theory) of a black powder which dyed leather in grayish black shades. The dyeings had high wet fastness properties.

The diamines and coupling components cited in Table 3 were used in a similar manner to prepare polymeric dyes having good wet fastness properties.

TABLE 3

| Ex. | Diamine | Coupling component | Color |
|---|---|---|---|
| 3.1 | 50 mmol of 4-amino-N-(4-aminophenyl)benzenesulfonamide | 48.5 mmol of 1-amino-8-hydroxy-3,6-naphthalenedisulfonic acid | dark violet |
| 3.2 | 50 mmol of 4,4'-diamino-stilbene | 48.5 mmol of 1-amino-8-hydroxy-3,6-naphthalenedisulfonic acid | navy |
| 3.3 | 50 mmol 4,4'-diamino-stilbene-2,2'-disulfonic acid | 48.5 mmol of 1-amino-8-hydroxy-3,6-naphthalenedisulfonic acid | blue |
| 3.4 | 50 mmol of 5-amino-2-[(4-aminophenyl)amino]-benzenesulfonic acid | 48.5 mmol of 1-amino-8-naphthol-4-sulfonic acid | greenish gray |
| 3.5 | 50 mmol of 4-amino-N-(4-aminophenyl)benzenesulfonamide | 48.5 mmol of 1-amino-8-naphthol-4-sulfonic acid | bluish gray |
| 3.6 | 50 mmol of 4,4'-diamino-stilbene | 48.5 mmol of 1-amino-8-naphthol-4-sulfonic acid | beige |
| 3.7 | 50 mmol of 4,4'-diamino-stilbene-2,2'-disulfonic acid | 48.5 mmol of 1-amino-8-naphthol-4-sulfonic acid | greenish gray |
| 3.8 | 50 mmol of 5-amino-2-[(4-aminophenyl)amino]-benzenesulfonic acid | 48.5 mmol of 1-amino-8-naphthol-4,6-disulfonic acid | bluish gray |
| 3.9 | 50 mmol of 4-amino-N-(4-aminophenyl)benzene sulfonamide | 48.5 mmol of 1-amino-8-naphthol-4,6-disulfonic acid | navy |
| 3.11 | 50 mmol of 4,4'-diamino-stilbene | 48.5 mmol of 1-amino-8-naphthol-4,6-disulfonic acid | black |
| 3.11 | 50 mmol of 4,4'-diamino-stilbene-2,2'-disulfonic acid | 48.5 mmol of 1-amino-8-naphthol-4,6-disulfonic acid | black |
| 3.12 | 25 mmol of bis-4-amino-benzenesulfonimide | 25 mmol of 1-amino-8-naphthol-3,6-disulfonic acid | navy |
| 3.13 | 25 mmol of bis-4-amino-benzenesulfonimide | 25 mmol of 1-amino-8-naphthol-4,6-disulfonic acid | violet |

EXAMPLE 4 a) 9.26 g (0.025 mol) of 4,4'-diaminostilbene-2,2'-disulfonic acid (diamine 1) were dissolved in a mixture of 75 ml of water and 2.75 ml of 50% strength by weight aqueous sodium hydroxide solution and admixed with 15.5 ml of 3.3M sodium nitrite solution. This solution was added to a mixture of 20 ml of concentrated hydrochloric acid and 100 g of ice. After a subsequent stirring at 0–5° C. for 3 h, the excess nitrite was removed with sulfamic acid. The thus-tetrazotized 4,4'-diaminostilbene-2,2'-disulfonic acid was adjusted to pH 2 with sodium bicarbonate.

b) A solution of 15.97 g (0.05 mol) of 1-amino-8-naphthol-25 3,6-disulfonic acid (coupling component III) in 200 ml of water was prepared by setting a pH of 6–7 with 50% strength by weight aqueous sodium hydroxide solution. This solution was added dropwise over 30 min at 15–10° C. to the tetrazonium solution described under a). The pH rose to 2.8. The solution was subsequently stirred at 10° C. for 2 h and at room temperature for 15 h. It was then admixed with 0.914 g (0.0083 mol) of solid resorcinol (coupling component IV) by stirring for 15 min.

c) 8.76 g (0.033 mol) of 4-amino—N-(4-aminophenyl) benzenesulfonamide (diamine 2) were initially charged in 67 ml of water and 33.3 ml of 5N hydrochloric acid. 67 g of ice and 20.7 ml of 3.3M sodium nitrite solution were added. After subsequent stirring at 0–5° C. for 1 h the excess nitrite was removed with sulfamic acid. The thus-prepared diazonium solution was added at 5–10° C. to the mixture obtained under b). After adjustment to pH 9.5–10 with 50% strength by weight aqueous sodium hydroxide solution the mixture was stirred at 5–10° C. for 2 h and then at room temperature for 15 h. The resulting suspension was heated to 50° C., subsequently stirred at that temperature for 90 min, at which point the dye was filtered off and dried, affording 37.6 g (96% of theory) of a brownish black powder which dyed chrome cattlehide leather black.

Example 4 was repeated with the Table 4 diamines 1 (25 mmol), diamines 2 (y mmol), coupling components III (50 mmol) and coupling components IV (x mmol) to prepare dyes which dye leather in reddish or bluish/violet-tinged black shades and have good wet fastness properties.

TABLE 4

| Ex. | Diamine 1 | Coupling component III | Coupling component IV | x mmol | Diamine 2 | y mmol | Colour |
|---|---|---|---|---|---|---|---|
| 4.1 | 4,4'-diaminostilbene-2,2'-disulfonic acid | 1-amino-8-naphthol-3,6-disulfonic acid | resorcinol | 16.66 | 4-amino-N-(4-amino-1-amino-8-naphthol-3,6-disulfophenyl)-benzenesulfonamide | 41.6 | violet |
| 4.2 | 4,4'-diaminostilbene-2,2'-disulfonic acid | 1-amino-8-naphthol-3,6-disulfonic acid | resorcinol | 25 | 4-amino-N-(aminophenyl)-benzenesulfonamide | 50 | gray |
| 4.3 | 4,4'-diaminostilbene-2,2'-disulfonic acid | 1-amino-8-naphthol-3,6-disulfonic acid | 3-amino-phenol | 8.3 | 4-amino-N-(4-aminophenyl)-benzenesulfonamide | 33.3 | bluish dark gray |
| 4.4 | 4,4'-diaminostilbene-2,2'-disulfonic acid | 1-amino-8-naphthol-3,6-disulfonic acid | 3-amino-phenol | 16.66 | 4-amino-N-(4-aminophenyl)-benzenesulfonamide | 41.6 | bluish black |
| 4.5 | 4,4'-diaminostilbene-2,2'-disulfonic acid | 1-amino-8-naphthol-3,6-disulfonic acid | 3-amino-phenol | 25 | 4-amino-N-(4-aminophenyl)-benzenesulfonamide | 50 | greenish gray |
| 4.6 | 4,4'-diaminostilbene-2,2'-disulfonic acid | 1-amino-8-naphthol-3,6-disulfonic acid | 1,3-diamino-benzene | 8.3 | 4-amino-N-(4-aminophenyl)-benzenesulfonamide | 33.3 | bluish black |
| 4.7 | 4,4'-diaminostilbene-2,2'-disulfonic acid | 1-amino-8-naphthol-3,6-disulfonic acid | 1,3-diamino-benzene | 16.66 | 4-amino-N-(4-aminophenyl)-benzenesulfonamide | 41.6 | greenish gray |
| 4.8 | 4,4'-diaminostilbene-2,2'-disulfonic acid | 1-amino-8-naphthol-3,6-disulfonic acid | 1,3-diamino-benzene | 25 | 4-amino-N-(4-aminophenyl)-benzenesulfonamide | 50 | gray |
| 4.9 | 4,4'-diaminostilbene-2,2'-disulfonic acid | 1-amino-8-naphthol-3,6-disulfonic acid | resorcinol | 16.6 | 4-amino-N-(4-aminophenyl)-benzenesulfonamide | 41.6 | olive |
| 4.10 | 4,4'-diaminostilbene-2,2'-disulfonic acid | 1-amino-8-naphthol-3,6-disulfonic acid | 3-amino-phenol | 16.6 | 4-amino-N-(4-aminophenyl)-benzenesulfonamide | 41.6 | green |
| 4.11 | 4,4'-diaminostilbene-2,2'-disulfonic acid | 1-amino-8-naphthol-3,6-disulfonic acid | resorcinol | 16.6 | 4,4'-diamino(diphenylamine)-2-sulfonic acid | 41.6 | navy |
| 4.12 | 4,4'-diaminostilbene-2,2'-disulfonic acid | 1-amino-8-naphthol-3,6-disulfonic acid | 3-amino-phenol | 16.6 | 4,4'-diamino(diphenylamine)-2-sulfonic acid | 41.6 | blue |
| 4.13 | 4,4'-diaminostilbene-2,2'-disulfonic acid | 1-amino-8-naphthol-3,6-disulfonic acid | resorcinol | 16.6 | 4,4'-diamino(diphenylamine)-2-sulfonic acid | 41.6 | blue |
| 4.14 | 4,4'-diaminostilbene-2,2'-disulfonic acid | 1-amino-8-naphthol-3,6-disulfonic acid | 3-amino-phenol | 16.6 | 4,4'-diamino(diphenylamine)-2-sulfonic acid | 41.6 | violet |
| 4.15 | 4,4'-diamino(di-phenylamine)-2-sulfonic acid | 1-amino-8-naphthol-3,6-disulfonic acid | resorcinol | 16.6 | 4,4'-diamino(diphenylamine)-2-sulfonic acid | 41.6 | blue |
| 4.16 | 4,4'-diamino(di-phenylamine)-2-sulfonic acid | 1-amino-8-naphthol-3,6-disulfonic acid | 3-amino-phenol | 16.6 | 4,4'-diamino(diphenylamine)-2-sulfonic acid | 41.6 | blue |
| 4.17 | 4,4'-diaminostilbene-2,2'-disulfonic acid | 1-amino-8-naphthol-4,6-disulfonic acid | 1,3-pheny-lenediamine | 16.6 | 4-amino-N-(4-aminophenyl)-benzenesulfonamide | 41.6 | violet |
| 4.18 | 4,4'-diaminostilbene-2,2'-disulfonic acid | 1-amino-8-naphthol-3,6-disulfonic acid | 1,3-pheny-lenediamine | 16.6 | 4,4'-diamino(diphenylamine)-2-sulfonic acid | 41.6 | dark green |
| 4.19 | 4,4'-diaminostilbene-2,2'-disulfonic acid | 1-amino-8-naphthol-3,6-disulfonic acid | 1,3-pheny-lenediamine | 16.6 | 4,4'-diamino(diphenylamine)-2-sulfonic acid | 41.6 | bluish gray |
| 4.20 | 4,4'-diamino(di-phenylamine)-2-sulfonic acid | 1-amino-8-naphthol-3,6-disulfonic acid | 1,3-pheny-lenediamine | 16.6 | 4,4'-diamino(diphenylamine)-2-sulfonic acid | 41.6 | blue |
| 4.21 | 4,4'-diamino(di-phenylamine)-2-sulfonic acid | 1-amino-8-naphthol-4,6-disulfonic acid | 3-amino-phenol | 16.6 | 4,4'-diamino(diphenylamine)-2-sulfonic acid | 41.6 | blue |

TABLE 4-continued

| Ex. | Diamine 1 | Coupling component III | Coupling component IV | x mmol | Diamine 2 | y mmol | Colour |
|---|---|---|---|---|---|---|---|
| 4.22 | 4,4'-diamino(di-phenylamine)-2-sulfonic acid | 1-amino-8-naphthol-4,6-disulfonic acid | 1,3-phenylenediamine | 16.6 | 4,4'-diamino(diphenylamine)-2-sulfonic acid | 41.6 | blue |
| 4.23 | 4,4'-diamino(di-phenylamine)-2-sulfonic acid | 1-amino-8-naphthol-4,6-disulfonic acid | 1,3-phenylenediamine | 16.6 | 4,4'-diamino(diphenylamine)-2-sulfonic acid | 41.6 | blue |
| 4.24 | 4,4'-diaminostilbene- | 1-amino-8-naphthol-4,6-disulfonic acid | resorcinol | 16.6 | 4,4'-diamino(diphenylamine)-2-sulfonic acid | 41.6 | blue |
| 4.25 | 4,4'-diaminostilbene- | 1-amino-8-naphthol-4,6-disulfonic acid | 3-aminophenol | 16.6 | 4,4'-diamino(diphenylamine)-2-sulfonic acid | 41.6 | blue |
| 4.26 | 4,4'-diaminostilbene- | 1-amino-8-naphthol-4,6-disulfonic acid | 1,3-phenylenediamine | 16.6 | 4,4'-diamino(diphenylamine)-2-sulfonic acid | 41.6 | blue |

EXAMPLE 5 a) 9.26 g (0.025 mol) of 4,4'-diaminostilbene-2,2'-disulfonic acid (Diamine 1) were dissolved in a mixture of 75 ml of water and 2.75 ml of 50% strength by weight aqueous sodium hydroxide solution and admixed with 15.5 ml of 3.3M sodium nitrite solution. This solution was added to a mixture of 20 ml of concentrated hydrochloric acid and 100 g of ice. After a subsequent stirring at 0–5° C. for 3 h, the excess nitrite was removed with sulfamic acid. The thus-tetrazotized 4,4'-diaminostilbene-2,2'-disulfonic acid was adjusted to pH 2 with sodium bicarbonate.

b) A solution of 15.97 g (0.05 mol) of 1-amino-8-naphthol-3,6-disulfonic acid (coupling component IV) in 200 ml of water was prepared by setting a pH of 6–7 with 50% strength by weight aqueous sodium hydroxide solution. This solution was added dropwise over 30 min at 15–10° C. to the diazonium solution described under a). The pH rose to 2.8. The solution was subsequently stirred at 10° C. for 2 h and at room temperature for 15 h. To this reaction mixture was added, dropwise at 0–5° C. over 60 min, a solution of 9.26 g (0.025 mol) of 4,4'-diaminostilbene-2,2'-disulfonic acid (diamine 2) tetrazotized as per a). All the while, the pH was maintained at 8.5 with 50% strength by weight aqueous sodium hydroxide solution. The mixture was stirred at 5–10° C. for 2 h and then at room temperature for 15 h. The resulting suspension was heated to 50° C., subsequently stirred at room temperature for 90 min, at which point the dye was filtered off and dried, affording 33.4 g (94% of theory) of a brownish black powder which dyed chrome cattlehide leather in a bluish black shade having good wet fastness properties.

Example 5 was repeated with the Table 5 diamines 1 (25 mmol), diamines 2 (25 mmol) and coupling components (50 mmol) to prepare dyes which dye leather in reddish or bluish/violet-tinged black shades and have good wet and light fastness properties.

TABLE 5

| Ex. | Diamine 1 | Coupling component | Diazo component 2 | Color |
|---|---|---|---|---|
| 5.1 | 4,4'-diaminostilbene-2,2'-disulfonic acid | 1-amino-8-naphthol-4,6-disulfonic acid | 4,4'-diaminostilbene-2,2'-disulfonic acid | blue |
| 5.2 | 4,4'-diaminostilbene-2,2'-disulfonic acid | 6-amino-1-naphthol-3-sulfonic acid | 4,4'-diaminostilbene-2,2'-disulfonic acid | violet |
| 5.3 | 4,4'-diaminostilbene-2,2'-disulfonic acid | 1-amino-8-naphthol-3,6-disulfonic acid | 4-amino-N-(4-aminophenyl)-benzenesulfonamide | dark blue |
| 5.4 | 4,4'-diaminostilbene-2,2'-disulfonic acid | 1-amino-8-naphthol-4,6-disulfonic acid | 4-amino-N-(4-aminophenyl)-benzenesulfonamide | blue |
| 5.6 | 4,4'-diaminostilbene-2,2'-disulfonic acid | 1-amino-8-naphthol-3,6-disulfonic acid | 4-amino-2-[(4-aminophenyl)-amino]benzenesulfonic acid | violet-tinged black |
| 5.7 | 4,4'-diaminostilbene-2,2'-disulfonic acid | 1-amino-8-naphthol-4,6-disulfonic acid | 5-amino-2-[(4-aminophenyl)-amino]benzenesulfonic acid | bluish gray |
| 5.8 | 4,4'-diaminostilbene | 1-amino-8-naphthol-3,6-disulfonic acid | 4,4'-diaminostilbene-2,2'-disulfonic acid | blue |
| 5.9 | 4,4'-diaminostilbene | 1-amino-8-naphthol-4,6-disulfonic acid | 4,4'-diaminostilbene-2,2'-disulfonic acid | bluish black |
| 5.10 | 4,4'-diaminostilbene | 6-amino-1-naphthol-3-sulfonic acid | 4,4'-diaminostilbene-2,2'-disulfonic acid | reddish violet |
| 5.11 | 4,4'-diaminostilbene | 1-amino-8-naphthol-3,6-disulfonic acid | 4-amino-N-(4-aminophenyl)-benzenesulfonamide | blue |
| 5.12 | 4,4'-diaminostilbene | 1-amino-8-naphthol-4,6-disulfonic acid | 4-amino-N-(4-aminophenyl)-benzenesulfonamide | blue |
| 5.13 | 4,4'-diaminostilbene | 1-amino-8-naphthol-3,6-disulfonic acid | 5-amino-2-[(4-aminophenyl)-amino]benzenesulfonic acid | blue |
| 5.14 | 4,4'-diaminostilbene | 1-amino-8-naphthol-4,6-disulfonic acid | 5-amino-2-[(4-aminophenyl)-amino]benzenesulfonic acid | blue |
| 5.15 | 5-amino-2-[(4-aminophenyl)-amino]-benzenesulfonic acid | 1-amino-8-naphthol-3,6-disulfonic acid | 4,4'-diaminostilbene-2,2'-disulfonic acid | bluish gray |

TABLE 5-continued

| Ex. | Diamine 1 | Coupling component | Diazo component 2 | Color |
|---|---|---|---|---|
| 5.16 | 5-amino-2-[(4-aminophenyl)-amino]-benzenesulfonic acid | 1-amino-8-naphthol-4,6-disulfonic acid | 4,4'-diaminostilbene-2,2'-disulfonic acid | blue |
| 5.17 | 5-amino-2-[(4-aminophenyl)-amino]-benzenesulfonic acid | 6-amino-1-naphthol-3-sulfonic acid | 4,4'-diaminostilbene-2,2'-disulfonic acid | violet |
| 5.18 | 5-amino-2-[(4-aminophenyl)-amino]-benzenesulfonic acid | 1-amino-8-naphthol-3,6-disulfonic acid | 5-amino-2-[(4-aminophenyl)-amino]benzenesulfonic acid | bluish black |
| 5.19 | 5-amino-2-[(4-aminophenyl)-amino]-benzenesulfonic acid | 1-amino-8-naphthol-4,6-disulfonic acid | 5-amino-2-[(4-aminophenyl)-amino]benzenesulfonic acid | bluish black |
| 5.20 | 4-amino-N-(4-aminophenyl)-benzenesulfonamide | 6-amino-1-naphthol-3-sulfonic acid | 4,4'-diaminostilbene-2,2'-disulfonic acid | red |

EXAMPLE 6

A mixture of 0.0375 mol of 1-amino-8-naphthol-3,6-disulfonic acid (coupling component 1) and 0.0125 mol of 3-amino-8-naphthol-6-sulfonic acid (coupling component 2) was dissolved in 100 ml of water at pH 6–7 by addition of sodium hydroxide solution. The solution thus prepared was added dropwise to the tetrazonium solution of 0.025 mol of 4,4'-diamino(diphenylamine)-2-sulfonic acid (diamine 1) prepared previously as per Example 1a), the pH being maintained at 1–2. The reaction mixture was stirred at 5–10° C. for two hours and at room temperature for 12 h. To this mixture was added, dropwise at 5–10° C., a solution of 0.025 mol of 4,4'-diaminobenzenesulfanilide (diamine 2), diazotized by a 15 method known in principle. The pH was gradually raised to 10–11 with 20% strength by weight aqueous sodium hydroxide solution. The mixture was subsequently stirred at 5–10° C. for 2 h and at room temperature for 12 h, heated to 50° C. for two hours and adjusted to pH 1–2 with 37% strength by weight hydrochloric acid, and the precipitated solid was isolated.

Oligomeric dyes were prepared similarly to Example 6 using the components reported in Table 6.

TABLE 6

| Ex. | Diamine 1 | Coupling component 1 | Coupling component 2 | Diamine 2 | Color |
|---|---|---|---|---|---|
| 6.1 | 25 mmol of 4,4'-diamino(diphenyl-amine)-2-sulfonic acid | 37.5 mmol of 1-amino-8-naphthol-3,6-disulfonic acid | 12.5 mmol of 3-amino-8-naphthol-6-sulfonic acid | 25 mmol of 4-amino-N-(4-aminophenyl)-benzenesulfonamide | violet |
| 6.2 | 25 mmol of 4,4'-diamino(diphenyl-amine)-2-sulfonic acid | 25 mmol of 1-amino-8-naphthol-3,6-disulfonic acid | 25 mmol of 3-amino-8-naphthol-6-sulfonic acid | 25 mmol of 4-amino-N-(4-aminophenyl)-benzenesulfonamide | violet |
| 6.3 | 25 mmol of 4,4'-diamino(diphenyl-amine)-2-sulfonic acid | 12.5 mmol of 1-amino-8-naphthol-3,6-disulfonic acid | 37.5 mmol of 3-amino-8-naphthol-6-sulfonic acid | 25 mmol of 4-amino-N-(4-aminophenyl)-benzenesulfonamide | violet |

EXAMPLE 7

Polycondensation with Coupling Component as Molecular Weight Regulator 0.050 mol of 4,4'-diaminostilbene-2,2'-disulfonic acid was diazotized similarly to 1a) and the pH adjusted to 2 with sodium bicarbonate. To this ice-cold mixture was added a pH 7 solution of 0.0485 mol of 1-amino-8-naphthol-3,6-disulfonic acid in 200 ml of water. The mixture was stirred at pH 2–3 for 3 h, at which point 0.00243 mol of phenol was added. The pH was then raised with 50% strength by weight aqueous sodium hydroxide solution to 12.5. The mixture was subsequently stirred for 12 h, heated at 50° C. for one hour, adjusted to pH 1.5 with 2N hydrochloric acid, and the precipitated solid was filtered off.

EXAMPLE 8

Polycondensation with Diazo Component as Molecular Weight Regulator 0.0475 mol of 4,4'-diaminostilbene-2,2'-disulfonic acid was diazotized similarly to 1a). 0.005 mol of aniline was diazotized and combined with the previous bisdiazo component. The pH of the ice-cold solution was raised to 2 with sodium bicarbonate, and 0.0485 mol of 1-amino-8-naphthol-3,6-disulfonic acid dissolved in water at pH 7 was slowly added dropwise. The batch was subsequently stirred at pH 3 and 5–10° C. for 2.5 h and then at pH 12–12.5 at room temperature for 12 h. It was then heated to 50° C. for two hours. The pH was lowered to 1.5 with 37% strength hydrochloric acid, solid potassium chloride was added, and the precipitated solid was isolated.

We claim:

1. An oligomeric azo dye having an alternating construction made up of tetrazo components and coupling components, containing in the molecule at least 3 units of the structure I

—[D—K]—        (I)

where D is a tetrazo component of the formula II

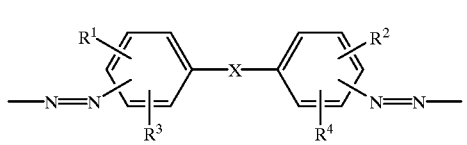

(II)

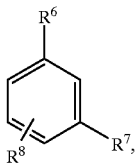

(IV)

where x is a direct bond, oxygen, sulfur or a bridge member of the formula —NHCO—, —NHCONH—, —CO—, —NHSO$_2$—, —SO$_2$NHSO$_2$—, —SO$_2$—, —SO$_2$—NH—A—NH—SO$_2$—, -NAlk-CO-, -NAlk-CO—NAlk-, -NAlk-CO—NH—, -NAlk-SO$_2$—, —SO$_2$-NAlk-SO$_2$—, —SO$_2$-NAlk-A-NAlk-SO$_2$—, —SO$_2$-NAlk-A-NH—SO$_2$—, —CH=CH—, —CH$_2$CH$_2$—, —C(CH$_3$)$_2$—, —CH$_2$— or —NH—, $R^1$ and $R^2$ are each independently of the other hydrogen, $C_1$–$C_4$-alkyl, $C_1$–$C_4$-alkoxy, $C_1$–$C_4$-alkanoyl, cyano, carboxyl, hydroxysulfonyl, $C_{1-C_4}$-alkoxycarbonyl, hydroxyl, carbamoyl, mono- or di-($C_1$–$C_4$)-alkyl-carbamoyl, sulfamoyl, mono- or di-($C_{-C_4}$)-alkyl-sulfamoyl, fluorine, chlorine, bromine, nitro or trifluoromethyl, $R^3$ and $R^4$ are each independently of the other hydrogen, hydroxysulfonyl or carboxyl, Alk is $C_1$–$C_4$-alkyl with or without hydroxyl, cyano, mono- or di-($C_1$–$C_4$)-alkylamino, amino, carboxyl or hydroxysulfonyl substitution and with or without interruption by 1 oxygen atom, and A is phenylene with or without hydroxysulfonyl substitution, and where K is a bivalent radical or a coupling component of the formula III

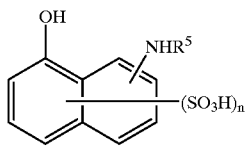

(III)

where $R^5$ is hydrogen, $C_1$–$C_4$-alkyl with or without hydroxyl, cyano, carboxyl, hydroxysulfonyl, methoxycarbonyl, ethoxycarbonyl or acetoxy substitution, and n is 1 or 2, wherein up to 90 mol % of component III is optionally replaced by a coupling component of the formula IV where $R^6$ and $R^7$ are each independently of the other hydroxyl, amino, morpholino, NHAlk or N(Alk)$_2$, and $R^8$ is hydrogen, carboxyl, hydroxysulfonyl, $C_1$–$C_4$-alkyl, $C_1$–$C_4$-alkoxy, $C_1$–$C_4$-alkoxycarbonyl, carbamoyl, mono- or di-($C_1$–$C_4$)-alkylcarbamoyl, sulfamoyl, mono- or di-($C_1$–$C_4$)-alkylsulfamoyl, -NHAlk or —N(Alk)$_2$.

2. An oligomeric azo dye as claimed in claim 1, wherein from 10 to 75 mol % of coupling component III are replaced by a coupling component IV.

3. A process for preparing an oligomeric azo dye as claimed in claim 1, which comprises tetrazotizing 1 mol equivalent of a diamine of the formula V

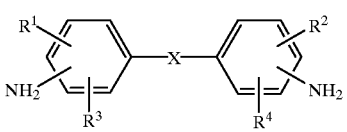

(V)

and coupling the product with from 0.97 to 1.03 mol equivalents of a coupling component III, wherein up to 90 mol % of component III is optionally replaced by a component IV, in an acidic medium and then polycondensing the product in a basic medium.

4. A process for preparing an oligomeric azo dye as claimed in claim 1, which comprises reacting 1 mol equivalent of a tetrazotized diamine V with from 0.97 to 1.03 mol equivalents of a coupling component of the formula VI

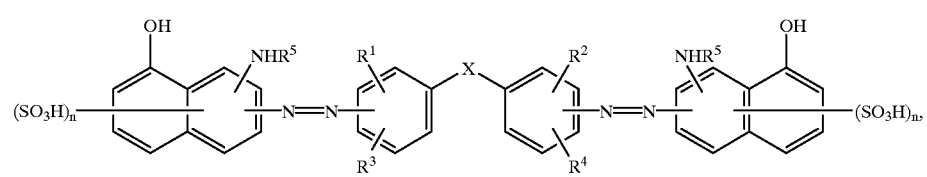

(VI)

where $R^1$, $R^2$, X and n are each as defined above, in a basic medium to form a polycondensation product, it being possible for up to 60 mol % of component VI to be replaced by a component IV.

5. A process for preparing an oligomeric azo dye as claimed in claim 1, which comprises tetrazotizing 1 mol equivalent of a diamine V and coupling the product with from 1.95 to 2.05 mol equivalents of a coupling component III in an acidic medium and then adding y mol equivalents of a coupling component IV and polycondensing the mixture with 1+y mol equivalents of a previously tetrazotized diamine under basic conditions, y being from 0 to 0.6.

6. A process as claimed in any of claim 1, wherein k mol of a singly coupling coupling component, based on 1 mol of starting diamine, is added to the reaction mixture after the acidic coupling, k being from 0.001 to 0.05 and the proportion of coupling component III being diminished by 0.5 k mol.

7. A process as claimed in any of claim 1, wherein k mol of a diazo component, based on 1 mol of coupling component, is added to the reaction mixture, k being from 0.001 to 0.05 and the proportion of diamine being diminished by 0.5 k mol.

8. An oligomeric azo dye obtainable by the processes of claim 3.

9. A process for dyeing or printing a natural or synthetic substrate which comprises applying an oligomeric azo dye of claim 1 to said substrate.

* * * * *